United States Patent
Kelly

(10) Patent No.: US 11,912,531 B2
(45) Date of Patent: Feb. 27, 2024

(54) ELEVATOR DOOR SENSOR ARRANGEMENT

(71) Applicant: AVIRE LIMITED, Berkshire (GB)

(72) Inventor: David Kelly, Waikato (NZ)

(73) Assignee: AVIRE LIMITED, Berkshire (GB)

( * ) Notice: Subject to any disclaimer, the term of this patent is extended or adjusted under 35 U.S.C. 154(b) by 1333 days.

(21) Appl. No.: 16/297,165

(22) Filed: Mar. 8, 2019

(65) Prior Publication Data
US 2020/0071133 A1    Mar. 5, 2020

(30) Foreign Application Priority Data

Aug. 29, 2018 (GB) ..................................... 1814019

(51) Int. Cl.
| B66B 5/00 | (2006.01) |
| B66B 13/24 | (2006.01) |
| G01V 8/10 | (2006.01) |
| G01V 8/00 | (2006.01) |

(52) U.S. Cl.
CPC ............ B66B 13/24 (2013.01); B66B 5/0018 (2013.01); G01V 8/005 (2013.01); G01V 8/10 (2013.01)

(58) Field of Classification Search
CPC ....... B66B 13/24; B66B 5/0018; B66B 13/26; G01V 8/005; G01V 8/10
See application file for complete search history.

(56) References Cited

U.S. PATENT DOCUMENTS

| 6,304,178 | B1 * | 10/2001 | Hayashida | .............. E05F 15/43 340/552 |
| 7,771,080 | B2 | 8/2010 | Platt | |
| 11,232,312 | B2 * | 1/2022 | Chen | .......................... G06T 7/50 |
| 2001/0045328 | A1 * | 11/2001 | Pustelniak | .............. B66B 13/26 187/316 |
| 2010/0319256 | A1 | 12/2010 | Agam et al. | |
| 2011/0016971 | A1 * | 1/2011 | Yulkowski | ........... G07C 5/0816 73/493 |
| 2013/0263511 | A1 | 10/2013 | Agam et al. | |

FOREIGN PATENT DOCUMENTS

| JP | 2008273709 A | 11/2008 | |
| WO | WO-2018025815 A1 * | 2/2018 | .............. E05F 15/71 |

OTHER PUBLICATIONS

Translation of WO 2018025815 A1 (Year: 2018).*
International Search Report issued in PCT Patent Application No. PCT/GB2019/052394 dated Feb. 4, 2020.
Written Opinion issued in PCT Patent Application No. PCT/GB2019/052394 dated Feb. 4, 2020.

* cited by examiner

*Primary Examiner* — David P Porta
*Assistant Examiner* — Mamadou Faye
(74) *Attorney, Agent, or Firm* — MARSHALL, GERSTEIN & BORUN LLP

(57) ABSTRACT

An elevator door sensor arrangement including: a position sensor configured to determine a configuration of an elevator door of an elevator car; an auxiliary sensor configured to monitor for an object in a sensing region outside of the elevator car, the region being an approach to the elevator car; and a door sensor controller configured to output a signal to a door controller indicating that an object has been sensed by the auxiliary sensor in the sensing region, wherein the sensing region is altered in size and/or location based on the configuration of the elevator door as determined by the position sensor.

14 Claims, 8 Drawing Sheets

ELEVATOR DOOR SENSOR ARRANGEMENT

TECHNICAL FIELD

Embodiments of the present invention relate to an elevator door sensor arrangement, an elevator car, and an elevator system.

BACKGROUND

Light curtains are used in relation to the operation of elevator doors to detect the presence of objects within the door aperture. These light curtains are typically connected to a door controller which is configured to control the movement of the elevator doors between open and closed positions.

Accordingly, when an object is detected by the light curtain associated with elevator doors, the door controller may cause the elevator doors to remain open or reverse their movement back towards the open position (i.e. re-open), for example.

To provide a visual indication of the operation of the light curtain and/or elevator doors to users, it is known to provide illuminable elements in the light curtain which may be selectively illuminated to provide an indication of the operation of the light curtain and/or elevator door. Such an arrangement is described in U.S. Pat. No. 7,771,080, which is hereby incorporated by reference, and sold as Panachrome by Avire Limited, UK.

There is a desire to improve the visual indications provided to elevator users.

Door sensors associated with elevators often need to detect objects not just blocking the door aperture but which are also approaching or adjacent the door aperture, for safety. However, this can increase the likelihood of elevator doors failing to close due to incorrectly sensed objects, lighting conditions adjacent the elevator doors, or passing objects which do not represent attempted entry into the elevator car. There is a need to provide improved safety without needless false triggers which prevent the elevator doors from closing.

SUMMARY

Embodiments seek to provide such improvements and alleviate the problems associated with the prior art.

Accordingly, an aspect provides an elevator door sensor arrangement including: a position sensor configured to determine a configuration of an elevator door of an elevator car; an auxiliary sensor configured to monitor for an object in a sensing region outside of the elevator car, the region being an approach to the elevator car; and a door sensor controller configured to output a signal to a door controller indicating that an object has been sensed by the auxiliary sensor in the sensing region, wherein the sensing region is altered in size and/or location based on the configuration of the elevator door as determined by the position sensor.

The sensing region may be reduced in size when the configuration of the elevator door is such that a width of an elevator door aperture has been reduced below a threshold width.

The sensing region location may be moved as the elevator door configuration changes to centre the sensing region with respect to an elevator door aperture.

The position sensor may be a light curtain which is also configured to detect an object obstructing the elevator door.

The light curtain may include a plurality of transmitters and receivers arranged across an elevator door aperture.

The position sensor and the auxiliary sensor may be configured for movement with the elevator car within an elevator shaft.

The auxiliary sensor may be a radar sensor.

The auxiliary sensor may be a microwave radar sensor.

The altering of the sensing region may be achieved by the selection of one or more predetermined sensing zones.

The sensing zones may include at least two sensing zones which overlap at least partially.

There may be two sensing zones and the selection of the sensing zone as the sensing region is determined by a width of an elevator door aperture.

Another aspect provides an elevator car including an elevator door sensor arrangement as above, wherein the auxiliary sensor is mounted for movement with the elevator car within an elevator shaft.

The auxiliary sensor may be mounted to an elevator header of the elevator car.

The auxiliary sensor may be mounted within the confines of the elevator car.

The position sensor may be mounted for movement with the elevator car within the elevator shaft.

In another aspect, an elevator door sensor controller is provided which is configured to: determine an intended operation of an elevator car associated with the elevator door sensor controller or a time when an expected operation of an elevator door will occur or when the elevator door will achieve a configuration; and control operation of one or more visible light emitters to provide a visual representation of the determined operation or time.

Control of the operation of one or more visible light emitters may include control to provide a countdown. Control of the operation of one or more visible light emitters may include changing one or more of a colour, illumination state, frequency of flashing, duration of illumination, and sequence of illumination. An elevator door sensor controller may be further configured to receive an indication of a trigger event and to determine when the expected operation will occur or configuration will be achieved using stored door operating period information associated with the trigger event. The stored door operating period information may include an indication of the expected operation or the configuration. An elevator door sensor controller may be further configured to store the door operating period information. The door operating period information may include indications of a plurality of trigger events, with associated time periods for when the expected operation will occur or configuration will be achieved. The door operating period information may include an indication of what the expected operation or configuration will be in association with the trigger event. The trigger event may include more than one sub-event which much all occur to constitute the trigger event. The elevator door sensor controller may be further configured to learn the door operating period information by monitoring the operation of the elevator door. The trigger event may include one or more of a detected operation or configuration change of the elevator door, and a user input from a car operating panel. The elevator door sensor controller may be further configured to be communicatively coupled to one or more of a main elevator controller and a door controller.

The elevator door sensor controller may be configured to send a signal to the door controller when an obstruction is detected by a door sensor of which the elevator door sensor controller is a part. The elevator door sensor controller may be further configured to output a maintenance alert when an actual time taken for the expected operation of an elevator door or the achievement of a configuration exceeds the expected time by more than a predetermined threshold. The intended operation of the elevator car may be an intended direction of travel of the elevator car. Another aspect provides an elevator door sensor including: an elevator door sensor controller; and the one or more visible light emitters. The elevator door sensor may be configured to be mounted such that the or each visible light emitter is carried by the elevator door. The or each visible light emitter may be configured to be provided on at least one edge of a door aperture. The or each visible light emitter may be part of a light curtain arrangement. Another aspect provides an elevator system including at least one elevator car and the elevator door sensor.

BRIEF DESCRIPTION OF THE DRAWINGS

Embodiments are described, by way of example only, with reference to the accompanying drawings, in which.

DESCRIPTION

Figure 1:
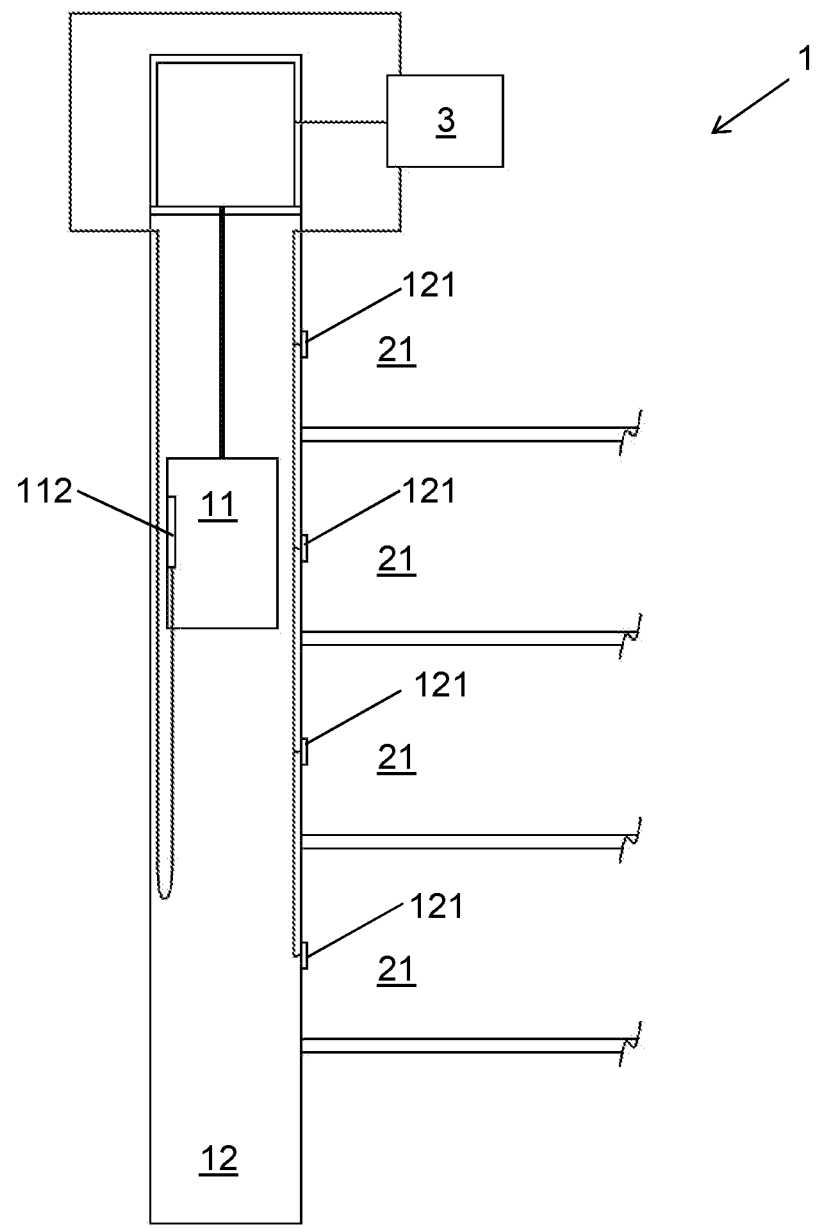
FIG. 1 shows a schematic simplified view of an elevator system.

With reference to FIG. 1, for example, an elevator system 1 may include one or more elevator cars 11 each provided in a respective elevator shaft 12.

The elevator system 1 may be fitted to a building or other facility which has a plurality of different levels 21. The elevator system 1 may be configured to serve each of the plurality of levels 21 to allow users and/or objects to travel between levels 21.

The or each elevator car 11 includes an elevator door 111 which can be moved between open and closed configurations to enable access to the elevator car 11 selectively. The elevator door 111 may be a sliding door which moves between the open and closed configurations through a linear movement.

In some embodiments, the elevator door 111 is provided in at least two parts which retract in opposing directions when moving from the closed to the open configuration, and extend towards each other when moving from the open to the closed configuration (i.e. a centre opening arrangement). Each part of the elevator door 111 may be provided as a plurality of sections, each section may move in a linear manner with respect to one or more other sections of the same part of the elevator door 111 (in a sliding movement). A similar arrangement of sections may be used for a side opening (or single door) arrangement of an elevator door 111—i.e. an elevator door 111 which includes a single part, which may be formed of multiple sections, which extends across the entire door opening when in the closed configuration.

Accordingly, a relatively large door aperture 111a may be provided by the overlapping position of the door sections when in the open configuration (the door aperture 111a being the opening of the door 111 at any given time and so reaches a maximum with the elevator door 111 in its open configuration and a minimum with the elevator door 111 in its closest configuration). This can be seen in FIGS. 2a-2d, for example.

The elevator door 111 may be configured to interact with an elevator shaft door such that the elevator door 111 operates synchronously with the elevator shaft door (moving between the open and closed configurations) when the elevator door 111 is adjacent the elevator shaft door. An elevator shaft door may be associated with each level 21 which is served by the elevator system 1. Accordingly, when the elevator car 11 stops at a particular level 21, the elevator door 111 may be generally adjacent an elevator shaft door for the level 21. The elevator door 111 and adjacent elevator shaft door may then be operate synchronously to allow access between the elevator car 11 and the level 21—i.e. to allow users and/or objects to enter or leave the elevator car 11.

Figure 3:
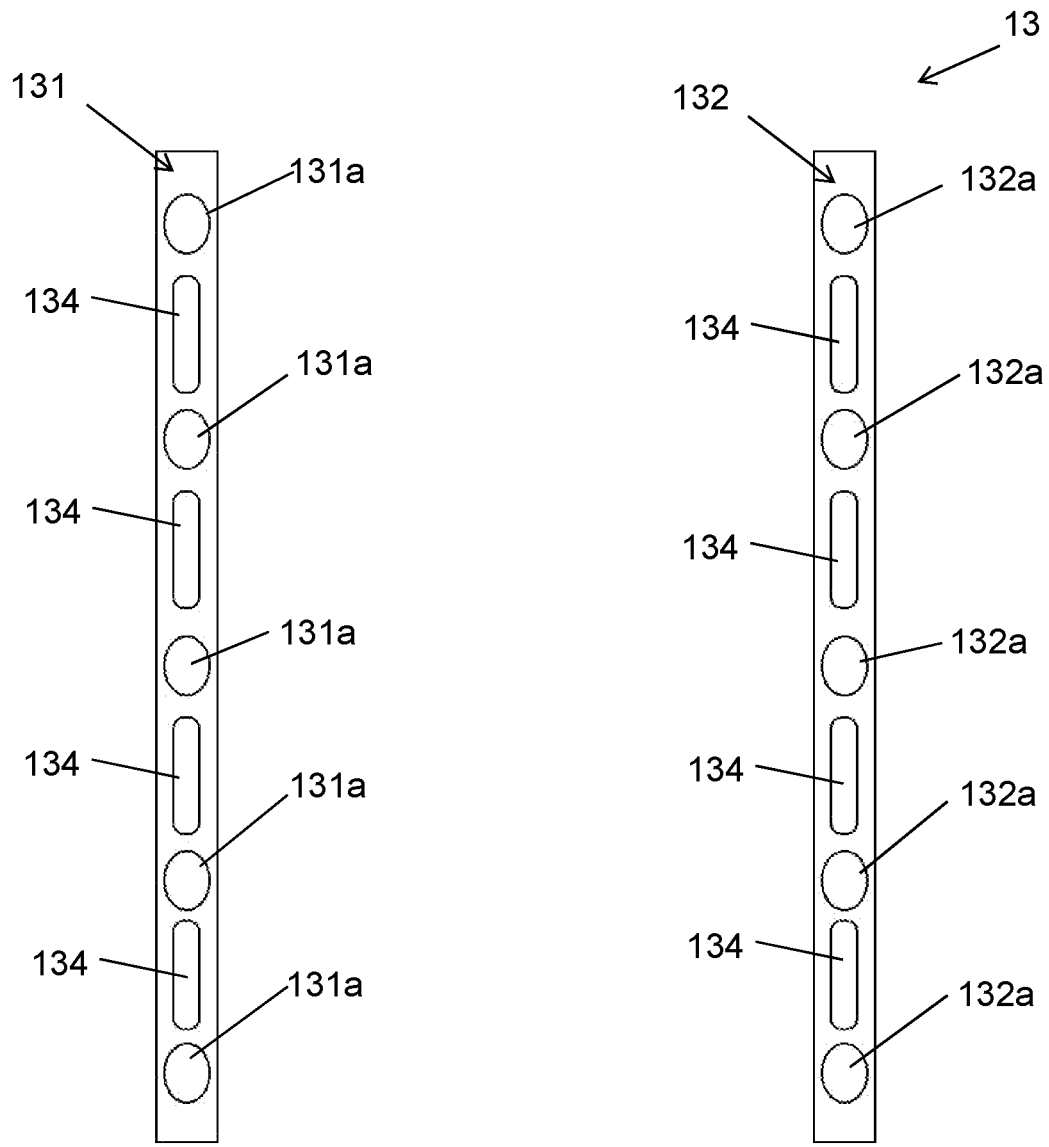
FIG. 3 shows a schematic simplified view of a door sensor.
Figure 4:
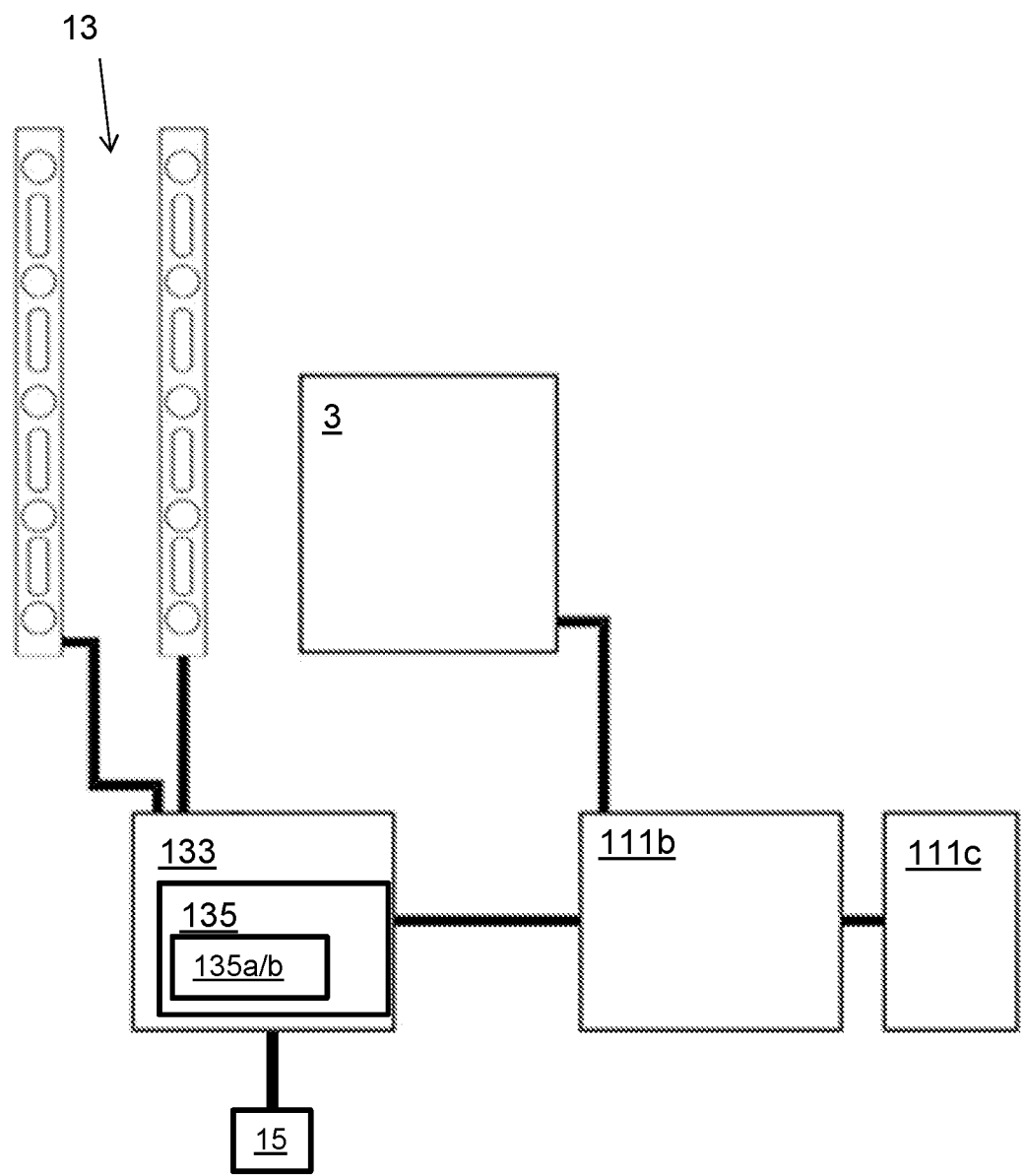
FIG. 4 shows a door sensor and other elevator system components.

The or each elevator door 111 is associated with a door sensor 13—see FIGS. 3 and 4, for example. The door sensor 13 is configured to detect one or more objects which would obstruct the movement of the elevator door 111 (and/or the elevator shaft door) to the closed configuration. In other words, the door sensor 13 associated with the or each elevator door 111 is configured to detect and object which may be hit by the movement of the elevator door 111 towards the closed configuration. The door sensor 13 may be provided in the form of a light curtain, for example.

The or each door sensor 13 may be communicatively coupled to a door controller 111b which is, in turn, communicatively coupled to a door driving mechanism 111c which is configured to drive the movement of the elevator door 111 from the open to the closed configuration (and potentially also from the closed to the open configuration).

On the sensing of an obstruction, the door sensor 13 which sensed the obstruction may send a signal to the door controller 111b which may, in turn, operate the door driving mechanism 111c to cease movement of the elevator door 111 towards the closed configuration and/or to reverse the movement of the elevator door 111 back towards the open configuration.

The or each door sensor 13 may be provided to prevent or reduce the risk of injury or damage to users or objects which may obstruct the operation of the elevator door 111. Indeed, users may even deliberately place an object or a part of their body in the path of the elevator door 111 whilst it is moving towards its closed configuration in order to cause the elevator door 111 to re-open—relying on the aforementioned operation of the door sensor 13.

The door sensor 13 may be mounted to the elevator car 11 (e.g. to the elevator door 111 (such as to the parts of the elevator door 111 or to the part of the elevator door 111 and to a slam post)). The door sensor 13 may be mounted to the leading edge or edges of the elevator door 111. As will be appreciated, if the elevator door 111 has only one part, then the slam post may effectively be a second (albeit stationary) leading edge of the elevator door 111.

Alternatively, the door sensor 13 may be mounted to the elevator shaft door(s).

Mounting the door sensor 13 to the elevator car 11 means that the same door sensor 13 is used irrespective of the level 21 at which the elevator car 11 is located. If a door sensor 13 is mounted to each elevator shaft door, then there will need to be multiple door sensors 13 (one for each level 21 for each elevator shaft 12).

The door sensor 13 could take a number of different forms. For example, the door sensor 13 may comprise an infrared door sensor 13 which has at least one infrared transmitter 131 (located on a first side of the door aperture 111a) and at least one infrared receiver 132 (located on a second, opposing, side of the door aperture 111a). An obstruction between the transmitter 131 and receiver 132 will be detected due to a change in received infrared light by the receiver 132. A corresponding signal will then be provided to the door controller 111b, as described herein.

The transmitter 131, whether using the infrared spectrum or some other part of the electromagnetic spectrum, may include a plurality of discrete emitter devices 131a—each emitter device 131a being configured to emit a signal for receipt by the receiver 132. Accordingly, in some embodiments, each emitter device 131a may include one or more light emitting diodes (which may each be configured to output infrared light in some embodiments).

Similarly, the receiver 132, whether using the infrared spectrum or some other part of the electromagnetic spectrum, may include a plurality of discrete receiver devices 132a—each receiver device 132a being configured to receive a signal emitted by the transmitter 131. Accordingly, in some embodiments, each receiver device 132a may include one or more phototransistors or photodiodes (which may each be configured to receive infrared light in some embodiments).

In some embodiments, the door sensor 13 may include both transmitters 131 and receivers 132 on the same side of the door aperture 111a, and such transmitter and receiver 131,132 arrangements may be provided on both sides of the door aperture 111a.

In some embodiments, the door sensor 13 may be configured to detect one or more objects or users adjacent but not yet obstructing the operation of the elevator door 111. To this end, the door sensor 13 may include one or more auxiliary transmitters and/or one or more auxiliary receivers. The or each auxiliary transmitter and/or receiver may be of the same type as described above in relation to the transmitters 131 and receivers 132. The one or more auxiliary transmitters and/or receivers may be configured to direct and receive light (such as infrared light) along respective axes which are angled with respect to each other and are directed generally outwardly with respect to the elevator car 11. An object or user located generally in front of the elevator door 111 may, therefore, be detected through analysis of the light received at the one or more auxiliary receivers. This is generally referred to herein as 3D object detection because of the ability to detect objects (and users) which are not within the generally 2D plane of the elevator door aperture 111a.

Other forms of 3D object detection may also be possible.

In some embodiments (see FIGS. 4-9, for example), the door sensor 13 includes an auxiliary sensor 15 which is configured to determine the presence of an object substantially adjacent the elevator door 111 or otherwise determine the presence of an object in a region which represents an approach to the elevator car 11 (i.e. an region through which objects approaching the elevator car 11 for entry into the car 11 will pass). The auxiliary sensor 15 may be provided as the one or more auxiliary transmitters and/or one or more auxiliary receivers, or may be provided separately therefrom.

In some embodiments, the auxiliary sensor 15 is mounted for movement with the elevator car 11 within the elevator shaft 12, such that the same auxiliary sensor 15 can be used on more than one level 21 (e.g. without requiring an auxiliary sensor to be provided on each level).

The auxiliary sensor 15 is mounted such that a field of view of the auxiliary sensor 15 encompasses a region generally adjacent the elevator door 111 (i.e. an approach to the elevator car 11) and outside of the elevator car 11 (i.e. a region of a landing of the level 21, for each such level 21—a landing being a part of the level 21 at which objects can enter or leave the elevator car 11).

The mounting of the auxiliary sensor 15 could take a number of different forms. For example, the auxiliary sensor 15 may be mounted so that it is partially or substantially entirely within the confines of the elevator car 11. The auxiliary sensor 15 may be mounted to a ceiling of the elevator car 11. The auxiliary sensor 15 may be mounted to part of the surround of the elevator door 111. The auxiliary sensor 15 may be mounted to an elevator header 113 of the elevator car 12 (see FIGS. 5, 6, and 7, for example). The auxiliary sensor 15 may be mounted to an elevator door 111 or to the door slam post or to an elevator floor, for example. However, mounting the auxiliary sensor 15 in a relatively high location means that interference with users of the elevator system 1 is less likely (whether accidental or intentional) and can provide an appropriate field of view for the auxiliary sensor 15.

Accordingly, in the depicted embodiments, the auxiliary sensor 15 is mounted to the elevator header 113 of the elevator car 11.

A field of view of the auxiliary sensor 15 may extend forwardly from the sensor 15. With the auxiliary sensor 15 mounted, for example, to the elevator header 113, a rear of the auxiliary sensor 15 will generally face into the elevator car 11 and a front of the auxiliary sensor 15 will generally face the landing of the level 21 when the elevator car 12 is located at a level 21.

The field of view of the auxiliary sensor 15 may be open when the elevator door 111 is open and may be obstructed when the elevator door 111 is closed. In other words, the auxiliary sensor 15 may be located on the elevator car side of the elevator door 111 such that the field of view of the auxiliary sensor 15 is at least partially determined by the configuration of the elevator door 111 (e.g. whether the door 111 is open or closed).

The auxiliary sensor 15 may be generally fixed with respect to the elevator car 12.

The field of view of the auxiliary sensor 15 may face generally downwardly and forwardly from the auxiliary sensor 15.

The auxiliary sensor 15 may be generally located centrally with respect to a width of elevator door aperture 111a. In some embodiments in which the elevator door 111 is a side opening door 111, the location of the auxiliary sensor 15 may be offset such that the auxiliary sensor 15 is located closer to the door slam than to the opposing part of the elevator door aperture 111a (with the elevator door 11 open).

The auxiliary sensor 15 may be an infrared sensor, a microwave sensor, a visible light sensor, or an acoustic sensor. In some embodiments, the auxiliary sensor 15 is a radar sensor. As will be appreciated, different sensors will have different characteristics. A microwave radar sensor may demonstrate good characteristics for use as the auxiliary sensor 15.

The auxiliary sensor 15 may be configured to determine the presence of an object within its field of view and may be configured to compare information gathered regarding the objects in its field of view over time. This may enable, for example, speed and/or direction of travel of one or more objects within the field of view of the auxiliary sensor 15 to be determined. For example, the auxiliary sensor 15 may be configured to determine one or more of whether a sensed object is substantially stationary or moving towards the elevator door 111 or moving across the field of view (e.g. parallel to the elevator door 111).

The field of view of the auxiliary sensor 15 may be separated into at least two zones. Each zone may represent a region of the field of view (generally comparable to an area of the landing of the level 21). The zones may be defined in a number of different manners. For example, the zones may be defined by ranges from the auxiliary sensor 15 and/or the elevator door 111. The ranges may, therefore, be defined as arcuate or linear regions or mixtures thereof—for example one or more squares, rectangles, segments of a circle, sectors of a circle, or the like, as projected onto a landing of a level 21. As will be appreciated, the region will extend from the auxiliary sensor 15 to the landing and may, therefore, have a conical form or similar. Examples of the shapes regions as projected onto the landing can be seen in FIGS. 5, 8, and 9 (although other combinations of shapes are envisaged too).

Figure 5:
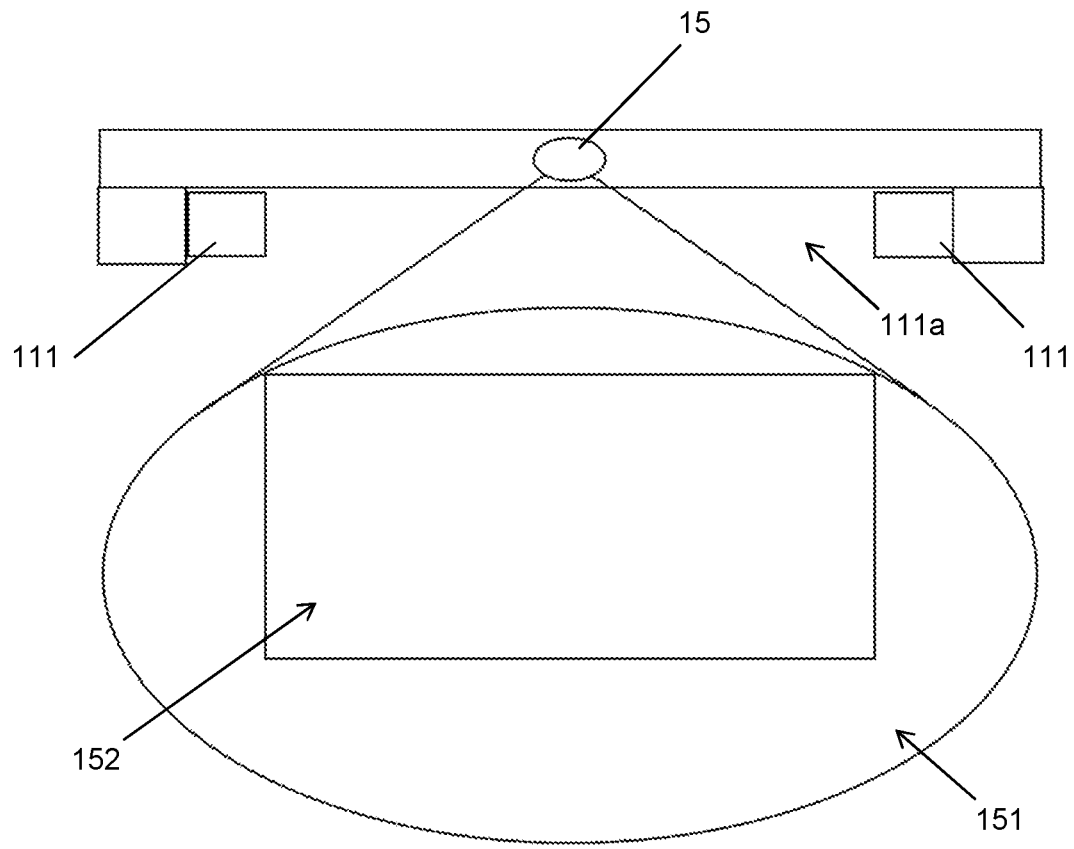
FIG. 5 shows a schematic view of an auxiliary sensor and the associated zones.
Figure 6:
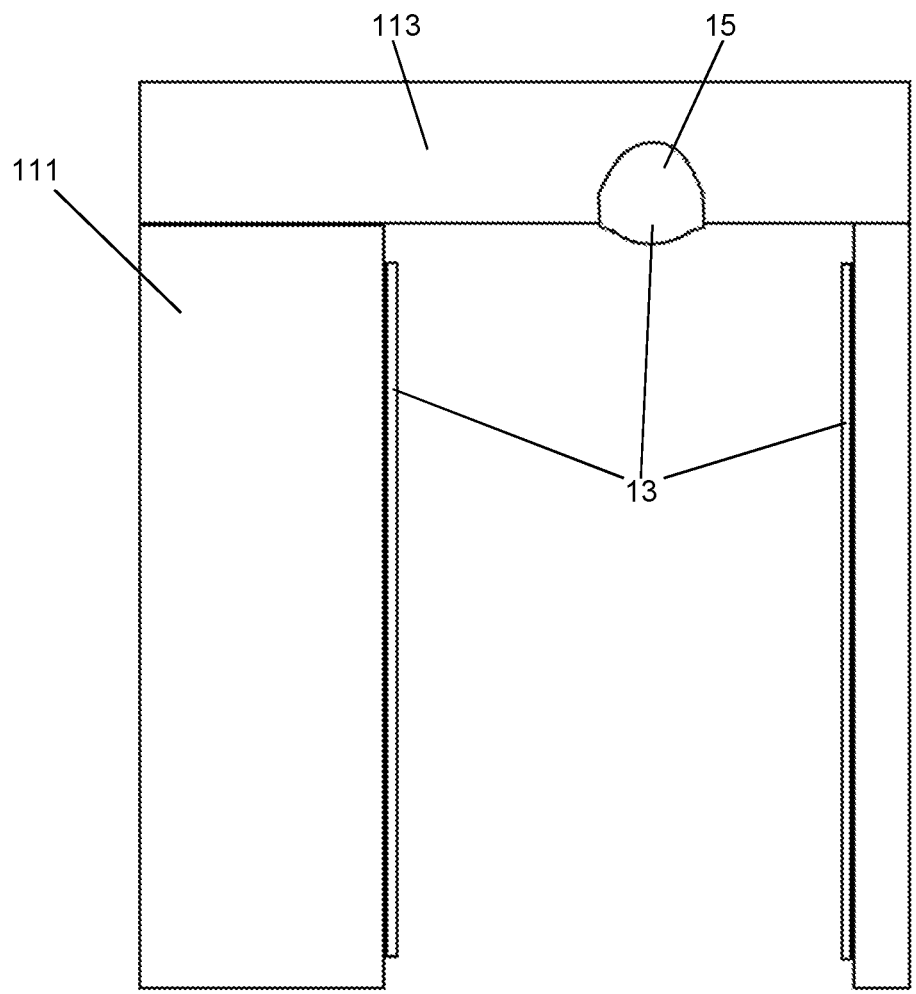
FIG. 6 shows a view from inside an elevator car with single elevator door.
Figure 7:
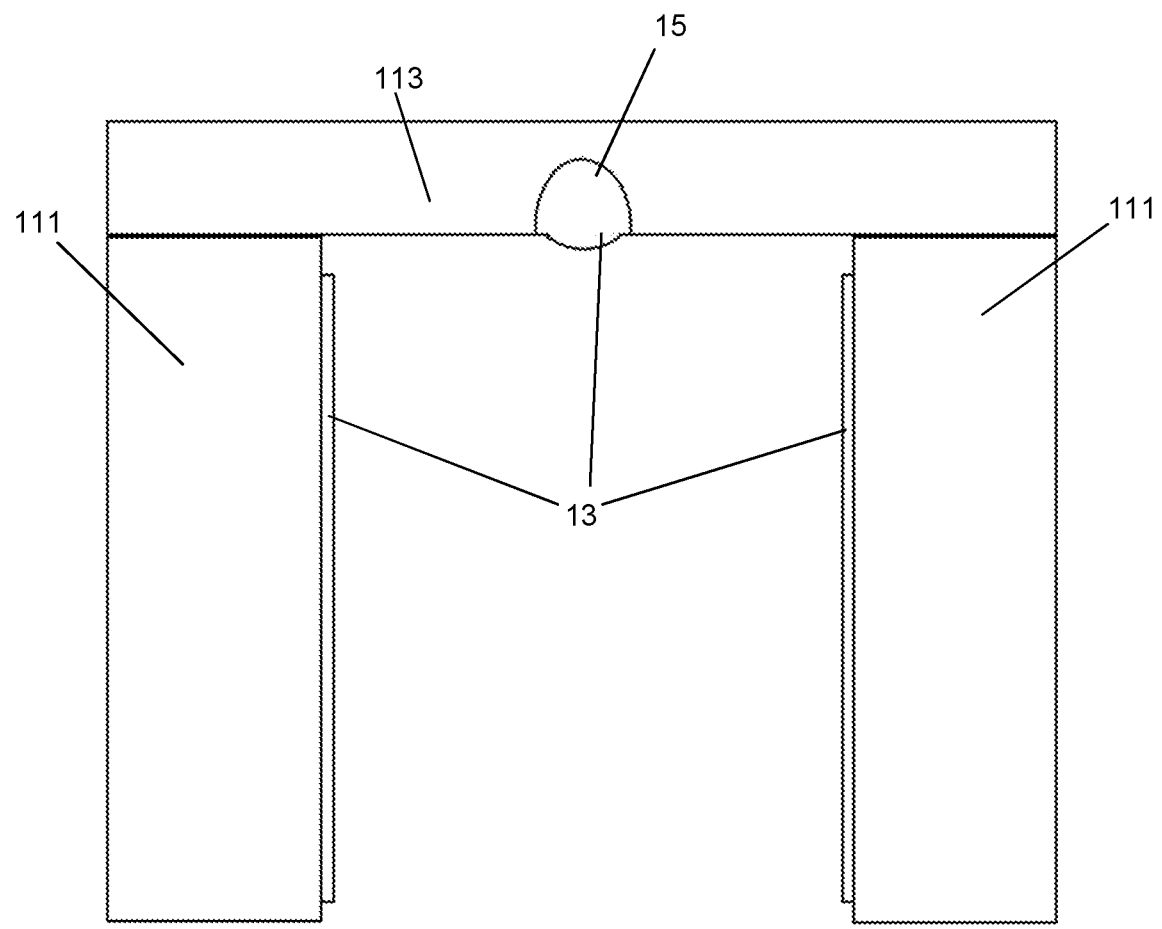
FIG. 7 shows a view from inside an elevator car with a pair of elevator doors.
Figure 8:
FIGS. 8 and 9 show different zone configurations.
Figure 9:
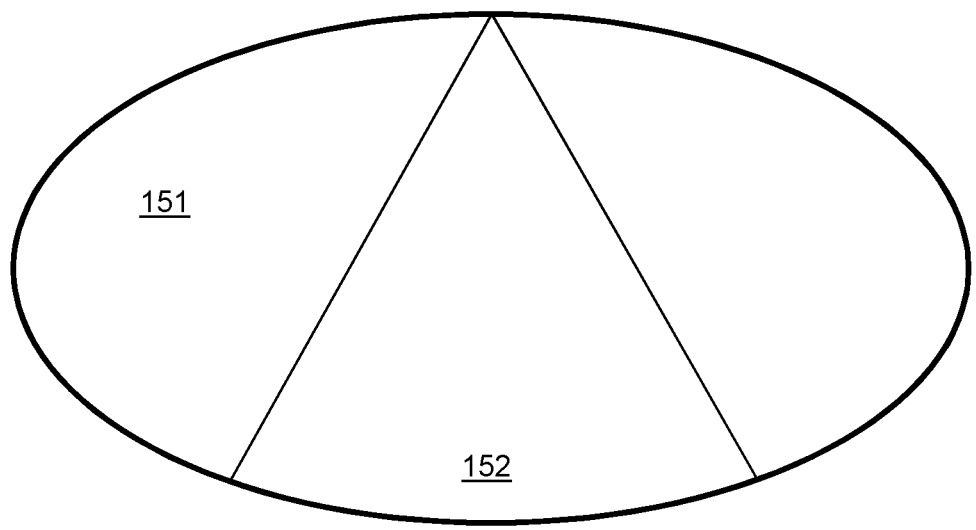

In some embodiments, one zone (a first zone 151) may be at least partially nested within another zone (a second zone 152)—which is the case in the three depicted examples of FIGS. 5, 8 and 9. In other words, there may be at least partial overlap between the zones. In some embodiments, a first zone 151 is larger than the second zone 152. The second zone 152 may, therefore, in some embodiments form a sub-section of the first zone 151.

In some embodiments, the second zone 152 may be a region which is closer to the auxiliary sensor 15 and/or elevator door 111 than the first zone 151. In some embodiments, the second zone 152 is a sub-section of the first zone 151 which is closer to the auxiliary sensor 15 and/or elevator door 111 than another part (or sub-section) of the first zone 151 (the other part (or sub-section) not forming part of the second zone 152).

The zones may be different sizes and/or may be in different locations with respect to each other.

In some embodiments, there are two zones, or three zones, or four zones, or more.

At least one zone (e.g. the second zone 152) may be smaller than the available field of view of the auxiliary sensor 15. In particular, the field of view (or effective field of view) of the auxiliary sensor 15 may vary as the elevator door 111 opens and closes. However, at least one zone is a sub-section of that field of view (or effective field of view) and at least part of the available field of view (or effective field of view) does not form part of that zone. The effective field of view may be, for example, the view through the door aperture 111a.

In some instances, the auxiliary sensor 15 is configured to ignore the elevator door 111 within the sensing region (or zone) and the field of view may not alter as the elevator door 111 opens and closes. References to the field of view of the auxiliary sensor 15 may, therefore, be references to the effective field of view, or the full field of view but ignoring the presence of the elevator door 111 within that field of view.

The auxiliary sensor 15 may be configured to sense objects selectively within different zones of the field of view of the auxiliary sensor 15. In other words, the auxiliary sensor 15 may be configured to activate sensing with respect to the zones selectively—such that objects in an inactive zone are ignored and objects within an active zone may be sensed. In other words, the auxiliary sensor 15 may have selectively controllable sensing regions (e.g. the aforementioned zones) and sensing may be limited to one or more sensing regions during operation.

Figure 2A:
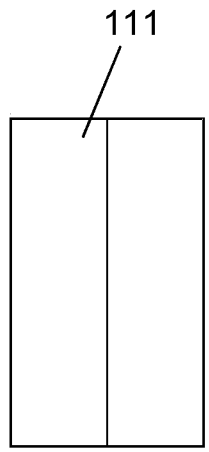
FIGS. 2a-d show a simplified view of an elevator car door opening.
Figure 2B:
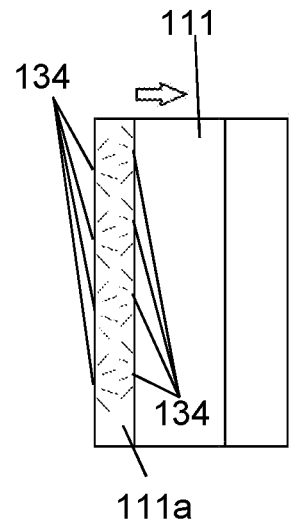
Figure 2C:
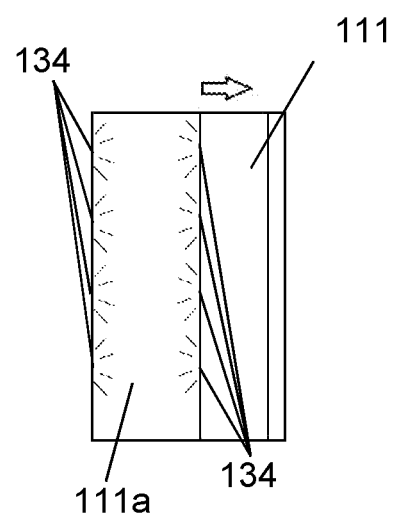
Figure 2D:
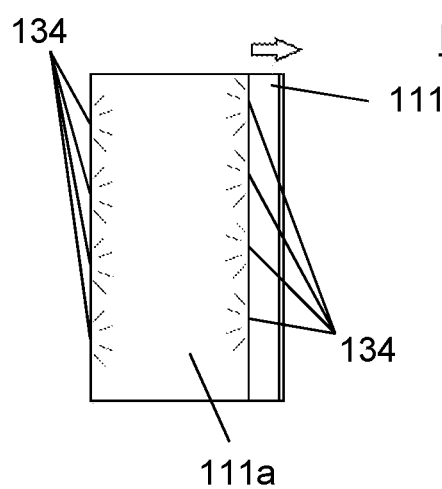

In some embodiments, the door sensor 13 includes one or more visible light emitters 134 which are each configured to emit light in the visible light spectrum—see FIGS. 2b-2d and 3, for example (FIGS. 2b-2d provide a graphical representation of the light emitted by the emitters 134 in some embodiments). The or each visible light emitter 134 may be configured to direct light into the elevator door aperture 111a. The light emitted by the or each visible light emitter 134 may convey information to the user(s) of the elevator car 11—e.g. by using different colours to indicate status or operational information. In some embodiments, the or each visible light emitter 134 is configured to emit a different colour of visible light to indicate whether the door sensor 13 has detected an obstruction (compared to the light emitted when no obstruction is detected), for example.

In some embodiments, the door sensor 13 includes one or more audible information devices 135 such as a buzzer, alarm, or speaker. The or each audible information device 135 may be configured to provide an audible indication of whether or not an obstruction has been detected, and/or whether the elevator door 11 is moving from the closed to the open configuration or from the open to the closed configuration. In some embodiments, the audible information is provided in spoken words and/or an alarm, siren or beeping sound. In some embodiments, the one or more audible information devices 135 include an internal device 135a configured to provide audible information inside the elevator car 11. In some embodiments, the one or more audible information devices 135 include an external device 135b configured to provide audible information outside the elevator car 11 (e.g. to one or more users near the elevator car 11 on a particular level 21).

In some embodiments, a door sensor controller 133 is provided. The door sensor controller 133 may be part of the door sensor 13. The door sensor controller 133 may be configured to control one or more aspects of the operation of the door sensor 13. These one or more aspects may include the operation of the transmitter 131 and/or receiver 132, and/or operation of the auxiliary transmitter and/or receiver, and/or the or each visible light emitter 134, and/or the or each audible information device 135,135a,135b, and/or any communication of the door sensor 13 to the door controller 111b (to control the operation of the door driving mechanism 111c), and/or the operation of the auxiliary sensor 15.

The door sensor controller 133 may be communicatively coupled (e.g. by a wired or wireless communication channel) to the door controller 111b and/or a main elevator controller 3 of the elevator system 1 which is configured to control the operation of one or more aspects of the elevator system 1. The main elevator controller 3 may include various inputs and outputs, as well as configuration interfaces, and the like, which enable the main elevator controller 3 to control the operation of the elevator system 1 and to allow an engineer to configure one or more parts of the elevator system 1.

The main elevator controller 3 may be communicatively coupled to one or more other input interfaces. The one or more other input interfaces may include a car operating panel 112. The car operating panel 112 may be provided within the elevator car 11 and may include a plurality of buttons (which may be individual buttons of the panel or parts of a graphical user interface (which may be provided on a touchscreen, for example)). The car operating panel 112 may be configured to receive user input (e.g. by actuation of one or more of the buttons thereof) and to send corresponding signals to the main elevator controller 3 and/or to the door controller 111*b*. The user input and corresponding signals may include instructions for the elevator car 11 to travel to a particular level 21, to cause the elevator door 111 to remain open, to cause the elevator door 111 to close, to cause the elevator door 111 to move towards the open position, to trigger an alarm, to activate an emergency intercom, and the like. Typically a car operating panel 112 includes a plurality of buttons, with each of the plurality representing a different level 21 and there being additional buttons of the or each other input, for example.

The one or more other input interfaces may include one or more call buttons 121. The or each call button 121 may be provided on associated levels 21. Actuation of a particular call button 121 by a user may cause the sending of a call signal to the main elevator controller 3 requesting that an elevator car 11 is sent to a level 21 associated with that particular call button 121—e.g. so that a user on that level 21 can enter the elevator car 11 and move to a different level 21 using the elevator car 11.

The door sensor controller 133 may be configured to control the operation of the or each visible light emitter 134—as mentioned above. For example, the door sensor controller 133 may be configured to cause the or each visible light emitter 134 to emit a first colour of visible light when the elevator door 111 is open and not closing, and/or a second colour of visible light when the elevator door 111 is closing, and/or a colour of visible light (which may be the first or a third colour of visible light) when the door sensor 13 detects an object. The first, second, and third colours of visible light may be different colours of visible light, for example.

The door sensor controller 133 may be configured to control the operation of the or each visible light emitter 134 based the sensed configuration and/or operation of the elevator door 111—as sensed using the door sensor 13 (e.g. the infrared transmitter(s) and receiver(s) 131,132).

In some embodiments, the door sensor controller 133 may be communicatively coupled to the door controller 111*b* such that the door controller 111*b* may provide information about the current configuration of the elevator door 111 and/or any currently underway or future changes in that configuration (e.g. from the open to the closed configuration or vice versa). This communicative coupling may be referred to, for example, as door controller feedback and may be provided by a wired or wireless communications link.

In some embodiments, as described herein, an operation of the elevator door 111 may be determined, at least in part, based on information generated about the operation of the elevator door 111 by the door sensor 13 (e.g. the state of or changes in configuration). The door sensor 13 may generate this information using, for example, the or each infrared transmitter and receiver 131,132 and/or may use other elements (which may include an acceleration or a separate position sensor mounted with respect to (e.g. on) the elevator door 111).

In some embodiments, the infrared transmitter and receiver 131,132 may be used to determine a distance between the leading edges of the elevator door 111 (one of which may be the door slam post). In other words, the infrared transmitter and receiver 131,132 may be used to determine a width of the elevator door aperture 111*a*. This may be achieved by, for example, monitoring the strength of the received infrared signals sent from the transmitter 131 to the receiver 132 (e.g. the magnitude of the received signal), when there is no obstruction (or in relation to a part in which there is no obstruction). A lookup table may be provided to match signal strengths to distances (i.e. widths)—the content of the lookup table having been generated in a prior calibration process.

Accordingly the infrared transmitter and receiver 131,132 may operate as a position sensor (as well as detecting obstructions). Other forms of position sensor are also envisaged and may be included—such position sensors being configured to determine a configuration of the elevator door 111 (i.e. whether the elevator door 111 is open or closed and, in some embodiments, the width of the elevator door aperture 111*a*).

As will be understood, the elevator door 111 has closed and open configurations, as described herein. The elevator door 111 is configured to move between these configurations, and maintain the open and closed configurations. These are all examples, therefore, of operations of the elevator door 111. There may, however, be other operations (which may be sub-categories of the aforementioned operations). For example, the elevator door 111 may be performing a so-called nudge operation. A nudge operation is a sub-category of a close operation and is typically enacted if an object is detected by the door sensor 13 for more than a predetermined period of time. In a nudge operation, the door controller 111*b* may operate the elevator door 111 towards the closed configuration even through there is a sensed obstruction. During a nudge operation one or more additional safety precautions may be enacted—such as ensuring that the elevator door 111 is moved towards the open configuration in the event of force preventing further closing of the elevator door 111 above a predetermined threshold. Nudge operations are used to help to encourage the removal of obstructions placed by users deliberately to delay the operation of the elevator system 1.

The door sensor controller 133 may be configured to determine such operations of the elevator doors 111 (including, for example, a nudge operation) by monitoring, for example, one or more of the size of the door aperture 111*a* over time using the door sensor 13 (such as the or each infrared transmitter and receiver 131,132), the movement of the elevator door 111 (e.g. as determined by an acceleration or position sensor of the door sensor 13), and the presence or absence of an obstruction (e.g. as determined using the or each infrared transmitter and receiver 131,132).

Therefore, as will be appreciated, the door sensor controller 133 may be configured to determine a current (i.e. present) configuration and/or operation of the elevator door 111.

In some embodiments, the door sensor controller 133 may be communicatively coupled to the car operating panel 112 such that one or more user inputs to the car operating panel 112 may be communicated to the door sensor controller 133. These one or more user inputs may be, for example, an input to request the elevator door 111 to open, to close, or to remain open, for example. This communicative coupling may be referred to, for example, as car operating panel feedback and may be provided by a wired or wireless communications link.

In some embodiments, the door sensor controller 133 is configured to determine when an expected (i.e. future) operation of the elevator door 111 will or is likely to occur. This operation may be a change in the configuration of the elevator door 111 such as a change from the open to the closed configurations (i.e. when the change in configuration will or is likely to occur), and/or may be another operation such as a nudge operation. The door sensor controller 133 may be configured to determine when an expected (i.e. future) configuration of the elevator door 111 will be achieved). The door sensor controller 133 may be configured to determine not only when the expected operation or configuration will occur but what that expected operation or configuration will be.

The operations of the elevator door 111 are typically controlled by the door controller 111b based on a computer program executed by that controller 111b. The computer program defines a number of rules which determine which operations of the elevator door 111 are executed and when they are executed. Typically, these rules will include predetermined delays which cause the elevator doors 111 to be held in a particular configuration for the predetermined delay period before another operation is executed. For example, when an elevator door 111 is opened, the rules may specify a predetermined delay period before a close operation (i.e. a movement of the elevator door 111 towards the closed configuration) is executed. As part of that close operation, the rules may require the presence (or absence) of an obstruction to be determined (using the door sensor 13). If an obstruction is detected, then the rules may specify a predetermined delay period before the close operation is re-attempted. Similar predetermined delay periods are typically defined in relation to all or substantially all changes in the operation of the elevator doors 111 (during normal use i.e. outside of fault conditions or maintenance operations).

Therefore, the door sensor controller 133 may be configured to determine when an expected (i.e. future) operation of the elevator door 111 will or is likely to occur based on one or more delay periods stored by the door sensor controller 133.

The door sensor controller 133 may, as will be understood, have no direct access to the predetermined delay periods used by the door controller 111b. Therefore, the door sensor controller 133 may retain stored delay period(s) independently of the door controller 111b.

The or each delay period stored by the door sensor controller 133 may include one or more of:
- a period the elevator door 111 is held in the open configuration;
- a period the elevator door 111 is held in the open configuration after detection of an obstruction;
- a period the elevator door 111 is held in the open configuration after a user input on the car operating panel (that input being to open or hold open the elevator door 111)—some car operating panels 112 may provide for multiple different user inputs in this regard, each associated with a different period, and the period stored by the door sensor controller 133 may be one, some, or all of the associated delays depending on which user input is received;
- a period the elevator door 111 takes to move from the open configuration to the closed configuration;
- a period the elevator door 111 takes to move from the closed configuration to the open configuration; and
- a period of time for which an obstruction is detected before a nudge operation is activated.

The door sensor controller 133 may use the door sensor 13 (and/or the communicative coupling to the car operating panel 112) in order to determine when a particular operation commences and/or how long a particular configuration of the elevator door 111 has been maintained.

The door sensor controller 133 may store the or each delay period, therefore, in association with at least one trigger event and/or at least one subsequent operation or configuration of the elevator door 111. The door sensor controller 133 may be configured to detect the or each trigger event.

As will be appreciated, therefore, the aforementioned delay periods stored by the door sensor controller 133 may be based on one or more predetermined events determined using the door sensor 13 and/or the communicative coupling to the car operating panel 112. The detection of the or each predetermined event may cause (e.g. trigger) the door sensor controller 133 to determine the associated delay period from the or each stored delay period. The door sensor controller 133 may then monitor the time elapsed since detection of the or each predetermined event to determine when (or when it is expected) that an operation of the elevator door 111 will be caused by the door controller 111b. The door sensor controller 133 may store the or each delay period in association with the predetermined trigger event and the expected change in operation or configuration of the elevator door 111. Therefore, the door sensor controller 133 may be configured to determine not only when there will be an expected change in the operation or configuration of the elevator door 111 but also what that operation or configuration of the elevator door 111 is expected to (or will) be.

A trigger event may effectively comprise a plurality of sub-events which comprise the conditions for the occurrence of that event. For example, a trigger event may comprise a sub-event that the elevator door 111 is in the open configuration and a sub-event that there has been one attempted movement of the door to the closed configuration but that this was prevented by a sensed obstruction.

The or each delay period, the associated trigger event, and/or the associated subsequent operation or configuration, may be stored during an initial setup of the door sensor controller 133. This information will be generally referred to herein as the door operating period information. Therefore, the door sensor controller 133 may be configured to store the door operating period information (e.g. as part of the commissioning of the elevator system 1 and/or the door sensor 13). This may be entered by an engineer, for example, using a computing device temporarily connected to the door sensor controller 133 for such purposes.

In some embodiments, the door sensor controller 133 is configured to learn the door operating period information.

In particular, the door sensor controller 133 may be configured to monitor the configuration and/or operation of the elevator door 111 using the door sensor 13 (which may include use of the or each infrared receiver and transmitter 131,132, the or each auxiliary transmitter and receiver, and/or the acceleration sensor of the door sensor 13).

The door sensor controller 133 may be configured to determine the occurrence of one or more trigger events (as described herein), the occurrence of a subsequent operation or configuration of the elevator door 111, the period between the trigger event and the subsequent operation/configuration, and (in some embodiments) the subsequent operation/configuration which occurred. This information may then be stored as the door operating period information by the door sensor controller 133.

The learning performed by the door sensor controller 133 may be implemented as part of a setup process for the door sensor controller 133. This setup process may be initiated on installation of the door sensor controller 133. The learning may be initiated periodically thereafter to update and/or confirm the stored door operating period information. In some embodiments, the learning is performed substantially continuously and the door operating period information updated and/or confirmed relatively frequently as a result.

Therefore, the door sensor controller 133 may have a learning mode of operation which may be implemented on installation, periodically, or substantially continuously. The learning mode may be implemented instead of or in combination with an operational mode (this being the mode in which the expected operation and/or configuration of the elevator door 111 is determined.

The door sensor controller 133 may be configured to control the operation of the or each visible light emitter 134 based at least in part on the expected operation and/or configuration of the elevator door 111 and when the operation and/or configuration of the elevator door 111 is expected to occur.

The door sensor controller 133 may be configured to use the or each visible light emitter 134 to provide an indication of the expected operation and/or configuration of the elevator door 111 and/or when that operation and/or configuration of the elevator door is expected to occur.

The door sensor controller 133 may be configured, for example, to use the colour of the or each visible light emitter 134, the illumination or non-illumination of the or each visible light emitter 134, flashing of the or each visible light emitter 134, a sequence of flashing of the or each visible light emitter 134, a frequency of flashing of the or each visible light emitter 134, a duration of illumination or non-illumination of the or each visible light emitter 134, and the like.

As described herein, there may be a plurality of visible light emitters 134 provided in a generally linear arrangement on the elevator door 111 (e.g. on a leading edge of an elevator door 111, or on each of the opposing edges the door aperture 111a). Therefore, there may be one or more linear arrangements of visible light emitters 134 provided according to some embodiments.

The door sensor controller 133 may be configured to control the or each linear arrangement of visible light emitters 134 to indicate, for example, when the expected operation and/or configuration will occur. The door sensor controller 133 may be configured to provide a countdown for example to when the operation/configuration will occur. This countdown may be provided by the sequential illumination or extinguishing of the illumination (i.e. changing from illumination to non-illumination) of the visible light emitters 134 of the or each liner arrangement of visible light emitters 134 (e.g. in an upward to downward direction, or vice versa, or towards a central point). Likewise, instead of illumination or non-illumination, the door sensor controller 133 may use sequential changes in colour in the same manner.

This countdown may be provided by a rain-effect in which the visible light emitters 134 are illuminated and extinguished such that there is the appearance of an illuminated element dropping down (or rising) along the or each linear arrangement of visible light emitters 134. The countdown may be conveyed by the illuminated element reaching the bottom (or top) of the or each linear arrangement of visible light emitters 134. The countdown may be conveyed by the frequency at which a series of such illuminated elements drop down (or rise) along the or each linear arrangement of light emitters 134. Again, instead of illumination and non-illumination, there may be a colour change in the same manner.

This countdown may be provided by increasing (or decreasing) the frequency of flashing of the visible light emitters 134 (e.g. of all of the visible light emitters of one or more linear arrangements). The flashing may be between illuminated and non-illuminated states or may be between colours, for example.

In some embodiments, a countdown may be provided, therefore, to the closing of the elevator door 111 or to the initiation of a nudge operation. The countdown may be provided from when the elevator door 111 begins a close operation to when the close configuration is achieved. Indeed, a countdown could be provided to any detectable operation of the elevator door 111 to the achievement of configuration of the elevator door 111.

The countdown operations as described herein are intended to provide the user with a visual indication of when an operation or configuration is expected to occur.

The countdown may not be linear but may appear to accelerate as the expected operation or configuration becomes imminent—e.g. to convey greater urgency. Accordingly, the frequency of any change in the operation (e.g. flashing) of the or each visible light emitter 134 may increase at a faster rate as the expected operation or configuration approach or approach completion.

The door sensor controller 133 may be configured to use the or each visible light emitter 134 to display additional information to a user. For example, the door sensor controller 133 may be configured to use the or each visible light emitter 134 to display an intended direction of travel to the user. This may be achieved in a number of different ways. For example, the direction of a rain-effect (as described above, or other sequential effect) may be downward indicating a downward intended direction of travel of the elevator car 11 or upward indicating an upward intended direction of travel of the elevator car 11.

In some examples (which could be in addition to or instead of a rain-effect), the door sensor controller 133 may be configured to control at least one visible light emitter 134 towards an upper part of the door aperture 111a to be in a different illumination state than at least one visible light emitter 134 towards a lower part of the door aperture 111a. These different states of illumination may be used to indicate an intended direction of travel. The states of illumination could be a different brightness of illumination, illuminated and not illuminated, or illumination in different colours of visible light. Likewise, the states of illumination could include different frequencies of flashing of the or each visible light emitter 134

The door sensor controller 133 may be configured to control the or each visible light emitter 134 to indicate a direction of travel without indicating any other information or in combination with other information as described herein.

The door sensor controller 133 may be configured to determine the intended direction of travel for the elevator car 11 (i.e. the direction of travel of the car 11 after it leaves the current level 21) from the main elevator controller 3. This intended direction of travel information may be received, for example, through the communicative coupling between the door sensor controller 133 and the main elevator controller 3. The intended direction of travel for the elevator car 11 may, in some embodiments, be obtained by the door sensor controller 133 from the car operating panel 112 which may, in turn, receive this information from the main elevator controller 3—e.g. so that this information can be presented to occupants of the elevator car 11 on a screen or other display device within the elevator car 11 (which may be part of or coupled to the car operating panel 112).

In some embodiments, the operation of the or each visible light emitter 134 is at least partially dependent on an operation of the elevator door 111. In some embodiments, the operation of the or each visible light emitter 134 is at least partially dependent on an operation (or intended operation) of the elevator car 11. In some embodiments, the operation of the or each visible light emitter 134 is at least partially dependent on an operation (or intended operation) of the elevator car 11 and on an operation of the elevator door 111.

In some embodiments, the operation of the or each visible light emitter 134 is not dependent on an operation of the elevator door 111 and, in such embodiments, the door sensor controller 133 as described herein may comprise two controllers—a controller which provides information to the door controller 111b for use in controlling the operation of the elevator door 111 and a controller which operates the or each visible light emitter 134. In some embodiments in which the operation of the or each visible light emitter 134 is not dependent on an operation of the elevator door 11, the door sensor controller 133 may be configured to determine when to operate the or each visible light emitter 134 based on information received (directly or indirectly—see above) from the main elevator controller 3 (such as location information for the elevator car 11), so that the or each visible light emitter 134 are only operated when the elevator car 11 is at a level 21 and not between levels 21. Likewise, the or each visible light emitter 134 may be extinguished after a predetermined period in which the elevator car 11 does not move—indicating a lack of use. This predetermined period may be determined by the main elevator controller 3 or, indeed, by the door sensor controller 133 or the door controller 111b.

In some embodiments, the visual indication provided to the user is also associated with a corresponding audible indication—which may be a beeping, buzzing, or similar sound which is operated in a corresponding manner (e.g. at a corresponding frequency) to visual indication provided by the or each visible light emitter 134. The audible indication may be provided by the audible information device 135.

As will be understood, the or each visible light emitter 134 may be provided on at least part of an elevator door 111 and may be provided as part of a leading edge of that door 111 or door part. The or each visible light emitter 134 may be provided in the same housing as at least part of the door sensor 13 (e.g. in the same housing as one or more infrared transmitters 131 and/or in the same housing as the one or more infrared receivers 132). The or each visible light emitter 134 may be provided as part of an edge device for an elevator door 111 which may be configured to provide a light curtain (e.g. across the door aperture 111a). The audible information device 135 may be similarly located in the same housing at least part of the door sensor 13 (e.g. in the same housing as one or more infrared transmitters 131 and/or in the same housing as the one or more infrared receivers 132).

The or each visible light emitter 134 may be a relatively simple light emitter or cluster of light emitters. In some embodiments, the or each visible light emitter 134 (whether considered individually or collectively) is not capable of displaying letters or words.

In some embodiments, the operation of door sensor controller 133 to control the or each visible light emitter 134 is comparatively simple. In particular, in some embodiments, the door sensor controller 133 need not receive (e.g. from the door controller 111b or the main elevator controller 3) complex information about the operation and future operation of the elevator door 111. Instead, in some embodiments, the door sensor controller 133 may determine when these operations and configurations are likely to be completed based on a trigger event and the door operating period information. This may make the door sensor controller 133 suitable for operation, for example, with a large number of different elevator systems 1—rather than, for example, having to have a completely different arrangement for each different make and/or model of elevator system 1. Likewise, in some embodiments, these abilities are retrofittable to an existing elevator system 1 (even if that elevator system 1 was not designed to allow such an arrangement to be implemented).

Embodiments seek to provide more information to users than is currently available regarding the operation of the elevator doors 111. This additional information may be particularly useful for vulnerable users (such as disabled users), who are provided with more information about how and/or when an operation of the elevator doors 111 is about to commence. In general, embodiments provide users with greater certainty regarding those operations and future configurations.

Some embodiments may seek to reduce instances of delayed operation of parts of an elevator system 1—e.g. reduce the number of times an elevator door 111 has to re-open or remain open due to a detected obstruction because the user is given an indication as to when a close operation will commence. These delays may mean the additional allocation or reallocation of resources within the elevator system 1—e.g. the allocation of a different elevator car 11 to service a user when a different (but delayed) elevator car 11 would have been able to service the user. Therefore, some embodiments seek to make elevator systems 1 more efficient.

As will be appreciated, the visual indication provided by some embodiments provides an implied, but direct, instruction to a user regarding the operation of the elevator system 1 and what actions they should take (e.g. remove an obstruction) or not take (e.g. cause an obstruction) to avoid disrupting the operation of the elevator system 1. As will also be appreciated, embodiments may seek to provide a visual indication of an internal operation of the elevator system 1 which is otherwise unknown and unknowable to the user.

In some embodiments, the actual period of time required to complete an operation of the elevator door 111 may be collected and stored by the door sensor controller 133. The actual period may be used to update the stored door operating period information and/or may be made available for maintenance purposes. This may include transmitting the actual period, along with other information to identify the elevator car 11 and the operation concerned, to a remote maintenance system and/or to the main elevator controller 3 and/or to a maintenance device of the elevator system 1. In some embodiments, the door sensor controller 133 may be configured to compare the actual period with one or more threshold periods and to transmit an alert (e.g. to a remote maintenance system) if the threshold is exceeded. In some embodiments, a device may be provided which is configured to monitor the illumination (or non-illumination) of one or more of the or each visible light emitters 134. In some such embodiments, this device may use the state of the or each monitored visible light emitter 134 to determine the actual period of time required to complete and operation of the elevator door 111. The device may then be configured to provide the actual period in the same manner as described in relation to the door sensor controller 133. In some embodiments, the actual period is determined by monitoring the operation of the or each infrared transmitters and receivers 131,132, for example.

The operation of the auxiliary sensor 15 may, in some embodiments, be determined at least in part by the expected operation and/or configuration of the elevator door 111. For example, the sensing region or regions currently active may be determined at least in part by the expected operation and/or configuration of the elevator door 111. In some embodiments, the operation of the auxiliary sensor 15 (e.g. the size and/or location of the sensing region (or zone)) is determined at least in part based on the current width of the elevator door aperture 111a, and this may be determined by use of the signal strength between the transmitter 131 and receiver 132 (or another form of position sensor).

In some embodiments, the size of the sensing region (or zone) is decreased as the elevator door 111 closes and/or when the closing of the elevator door 111 commences. Thus, with the elevator door 111 open, the first zone 151 may be active; however, as the elevator door closes, the second zone 152 may be active. As will be appreciated, the deactivation of a zone and activation of another zone may be considered equivalent to alteration of the size and/or location of the sensing region (or zone)—with the sensing region or zone being the currently active zone (or zones).

In some embodiments, therefore, the size of the sensing region (or zone) is decreased as the elevator door 111 closes and/or the location of the sensing region (or zone) is altered as the elevator door 111 closes. In other words, the size of the sensing region (or zone) may be decreased as the elevator door aperture 111a decreases in width. In some embodiments, the sensing region (or zone) is largest when the elevator door 111 is fully open (i.e. when the elevator door aperture 111a is at its maximum size). The largest sensing region (or zone) may be the full field of view of the auxiliary sensor 15.

In some embodiments, the size and/or location of the sensing region (or zone) is increased as the elevator door 111 opens. In some embodiments, the sensing region (or zone) is set to the largest sensing region (or zone) once the elevator door 111 has started to open and/or reaches an open configuration (again, this may be determined by the position sensor, which may use the transmitters 131 and receivers 132).

As will be appreciated, in some embodiments, the field of view of auxiliary sensor 15 may be blocked or partially blocked by the elevator door 111 during movement of the elevator door 111 between the open and closed positions thereof.

The auxiliary sensor 15 may be configured to distinguish between objects within it field of view and the elevator door 111 blocking at least part of the field of view of the auxiliary sensor 15. For example, the auxiliary sensor 15 may be configured to detect the elevator door 111 due to its close proximity to the auxiliary sensor 15 and/or the linear movement of the elevator door 111 across the field of view of the auxiliary sensor 15. Objects detected by the auxiliary sensor 15 which need to trigger opening of the elevator door 111, for example, will be at a greater distance from the auxiliary sensor 15 than the elevator door 111 (and may be travelling in a different direction with respect thereto—i.e. towards the elevator door aperture 111a rather than parallel thereto).

In some embodiments, the determined width of the elevator door aperture 111a (e.g. using the signal strength as described herein) may be used to determine whether a sensed object is likely to be the elevator door 111 entering the field of view of the auxiliary sensor 15.

In some embodiments, the size and/or location of the sensing region (or zone) is altered through the activation of a different zone (said different zones may be overlapping, as discussed herein). This may be referred to as discrete alteration of the size and/or location of the regions (or zone). Each change in zone activation may be triggered when the width of the elevator door aperture 111a passes a predetermined threshold width.

In some embodiments, the size and/or location of the sensing region (or zone) is altered on a substantially continuous basis (i.e. with there effectively being a large number of different regions (or zones)).

The location of the sensing region (or zone) may be substantially centred on the elevator door aperture 111a (which alters during operation of the elevator door 111). In some embodiments, the location of the sensing region (or zone) may be substantially centred on a view through the elevator door aperture 111a from the auxiliary sensor 15.

The auxiliary sensor 15, as part of the door sensor 13, may detect the presence of an object requiring the elevator door 111 to be opened or to remain open, for example.

The auxiliary sensor 15 may be configured to sense such objects only in the active (i.e. sensing) region (or zone) of its field of view. Therefore, adjustment of the sensing region (or zone) during operation determines where an object needs to be in order to trigger the elevator door 111 to be opened or to remain open.

The sensing of an object in this manner by the auxiliary sensor 15 may be treated in the same manner as an obstruction between the leading edges of the elevator door 111—i.e. triggering the elevator door 111 to be opened or to remain open. Indeed, the door sensor controller 133 may be configured to output a signal to the door controller 111b if either an obstruction between the leading edges of the elevator door 111 is detected (e.g. using the transmitter 131 and receiver 132) or an object is detected (in the sensing region or zone) approaching the elevator door 111. The door sensor controller 133 may be configured to interleave signals triggered by the transmitter 131 and receiver 132 with signals triggered by the auxiliary sensor 15.

As will be appreciated, therefore, whilst objections between the leading edges of the elevator door 111 may be detected at all times (or at least at all times when the elevator door 111 is closing), the sensing region (for embodiments including the auxiliary sensor 15) may change as the elevator door aperture 111a changes is size (i.e. width) during opening and closing of the elevator door 111. As the elevator door 111 closes, the sensing region may reduce in size and/or move with the elevator door aperture 111a. This may reduce the risk of incorrect triggering of the elevator door 111 to return to the open position—i.e. the incorrect triggering of a signal from the door sensor controller 133 to the door controller 111b. Incorrect triggering may, otherwise, be due to an object which is not attempting to enter the elevator car 11 or an object which is unlikely to be able to enter the elevator car 11 (and/or obstruct the leading edges of the elevator door 111) before the elevator door 111 closes.

The door sensor 13 as described herein includes the transmitter 131 and receiver 132 arrangement, along with the auxiliary sensor 15. In some embodiments this is conceptually useful because the door sensor 13 may provide a single output to the elevator door controller 111b to trigger the opening of the elevator door 111 (or to indicate that the elevator door 111 is to remain open). The door controller 111b may be unaware of which part of the door sensor 13 has detected an obstruction or potential obstruction. This is useful in some examples so that an embodiment including the auxiliary sensor 15 can be retrofitted to a door controller 111b which does not otherwise have support for the auxiliary sensor 15 (and which may not have support for any form of 3D sensing). Thus, the safety of existing elevator systems 1 can be improved through the use of a door sensor 13 of some embodiments (a door sensor 13 which does not necessarily include the visible light emitters 134, for example).

In some embodiments, however, the auxiliary sensor 15 is not part of the door sensor 13 as such. In embodiments such as these, the auxiliary sensor 15 may have its own controller and this controller may receive information regarding the current configuration of the elevator door 111 (e.g. the width of the elevator door aperture 111a). This information may be received from the door sensor 13, which may be communicatively coupled to the controller of the auxiliary sensor 15. The controller of the auxiliary sensor 15 may be configured to output a signal to trigger the opening of the elevator door 111 (or to indicate that the elevator door 111 should remain open) based on the information from the auxiliary sensor 15 and the information about the current configuration of the elevator door 111. This signal may be output to the door controller 111b (the door controller 111b may be configured to receive this as a separate input to a signal triggered by the door sensor 13, for example) or may be output to another controller or interface which is configured to interleave or otherwise combine signals from that controller and from the door sensor 13 (e.g. from the door sensor controller 133). In other words, there may be multiple controllers and these controllers associated with the auxiliary sensor 15 and the door sensor 13 may be communicatively coupled to provide an output to the door controller 111b.

Accordingly, the door sensor 13 may be referred to as a door sensor arrangement in which the door sensor arrangement includes the auxiliary sensor 15 and the other parts of the door sensor 13 described herein.

The or each controller described herein (e.g. the door sensor controller 133, the door controller 111b, and the main elevator controller 3) may comprise a respective computing device. The or each computing device may include a processing unit which is communicatively coupled to memory (i.e. a computer readable storage medium). The operations of the or each controller may be provided as instructions stored on their readable storage medium and which, when executed, cause the process to be performed. In relation to the door sensor controller 133, the door operating period information may be stored on the computer readable medium of the door sensor controller 133.

Whilst the door sensor controller 133 and the door controller 111b have been described as separate controllers, they may—in some embodiments—be integrated into a single controller.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

Representative features are set out in the following clauses, which stand alone or may be combined, in any combination, with one or more features disclosed in the text and/or drawings of the specification.

Aspects

A1. An elevator door sensor controller configured to:
determine an intended operation of an elevator car associated with the elevator door sensor controller or a time when an expected operation of an elevator door will occur or when the elevator door will achieve a configuration; and
control operation of one or more visible light emitters to provide a visual representation of the determined operation or time.

A2. An elevator door sensor controller according to aspect A1, wherein control of the operation of one or more visible light emitters includes control to provide a countdown.

A3. An elevator door sensor controller according to aspect A1 or A2, wherein control of the operation of one or more visible light emitters includes changing one or more of a colour, illumination state, frequency of flashing, duration of illumination, and sequence of illumination.

A4. An elevator door sensor controller according to any of aspects A1 to A3, further configured to receive an indication of a trigger event and to determine when the expected operation will occur or configuration will be achieved using stored door operating period information associated with the trigger event.

A5. An elevator door sensor controller according to aspect A4, wherein the stored door operating period information includes an indication of the expected operation or the configuration.

A6. An elevator door sensor controller according to aspect A4 or A5, further configured to store the door operating period information.

A7. An elevator door sensor controller according to aspect A6, wherein the door operating period information includes indications of a plurality of trigger events, with associated time periods for when the expected operation will occur or configuration will be achieved.

A8. An elevator door sensor controller according to aspect A7, wherein the door operating period information includes an indication of what the expected operation or configuration will be in association with the trigger event.

A9. An elevator door sensor controller according to any of aspects A4 to A8, wherein the trigger event includes more than one sub-event which much all occur to constitute the trigger event.

A10. An elevator door sensor controller according to any of aspects A4 to A9, further configured to learn the door operating period information by monitoring the operation of the elevator door.

A11. An elevator door sensor controller according to any of aspects A4 to A10, wherein the trigger event includes one or more of a detected operation or configuration change of the elevator door, and a user input from a car operating panel.

A12. An elevator door sensor controller according to any of aspects A1 to A11, further configured to be communicatively coupled to one or more of a main elevator controller and a door controller.

A13. An elevator door sensor controller according to aspect A12, wherein the elevator door sensor controller is configured to send a signal to the door controller when an obstruction is detected by a door sensor of which the elevator door sensor controller is a part.

A14. An elevator door sensor controller according to any of aspects A1 to A13, further configured to output a maintenance alert when an actual time taken for the expected operation of an elevator door or the achievement of a configuration exceeds the expected time by more than a predetermined threshold.

A15. An elevator door sensor controller according to any of aspects A1 to A14, wherein the intended operation of the elevator car is an intended direction of travel of the elevator car.

A16. An elevator door sensor including: an elevator door sensor controller according to any of aspects A1 to A15; and the one or more visible light emitters.

A17. An elevator door sensor according to aspect A16, configured to be mounted such that the or each visible light emitter is carried by the elevator door.

A18. An elevator door sensor according to aspect A16 or A17, wherein the or each visible light emitter is configured to be provided on at least one edge of a door aperture.

A19. An elevator door sensor according to aspect A18, wherein the or each visible light emitter is part of a light curtain arrangement.

A20. An elevator system including at least one elevator car and the elevator door sensor according to any of aspects A16 to A19.

B1. An elevator door sensor arrangement including:
a position sensor configured to determine a configuration of an elevator door of an elevator car;
an auxiliary sensor configured to monitor for an object in a sensing region outside of the elevator car, the region being an approach to the elevator car; and
a door sensor controller configured to output a signal to a door controller indicating that an object has been sensed by the auxiliary sensor in the sensing region, wherein the sensing region is altered in size and/or location based on the configuration of the elevator door as determined by the position sensor.

B2. An elevator door sensor arrangement according to aspect B1, wherein the sensing region is reduced in size when the configuration of the elevator door is such that a width of an elevator door aperture has been reduced below a threshold width.

B3. An elevator door sensor arrangement according to aspect B1 or B2, wherein the sensing region location is moved as the elevator door configuration changes to centre the sensing region with respect to an elevator door aperture.

B4. An elevator door sensor arrangement according to any of aspects B1 to B3, wherein the position sensor is a light curtain which is also configured to detect an object obstructing the elevator door.

B5. An elevator door sensor arrangement according to aspect B4, wherein the light curtain includes a plurality of transmitters and receivers arranged across an elevator door aperture.

B6. An elevator door sensor arrangement according to any of aspects B1 to B5, wherein the position sensor and the auxiliary sensor are configured for movement with the elevator car within an elevator shaft.

B7. An elevator door sensor arrangement according to any of aspects B1 to B6, wherein the auxiliary sensor is a radar sensor.

B8. An elevator door sensor arrangement according to aspect B7, wherein the auxiliary sensor is a microwave radar sensor.

B9. An elevator door sensor arrangement according to any of aspects B1 to B8, wherein the altering of the sensing region is achieved by the selection of one or more predetermined sensing zones.

B10. An elevator door sensor arrangement according to aspect B9, wherein the sensing zones include at least two sensing zones which overlap at least partially.

B11. An elevator door sensor arrangement according to aspect B9 or B10, wherein there are two sensing zones and the selection of the sensing zone as the sensing region is determined by a width of an elevator door aperture.

B12. An elevator car including an elevator door sensor arrangement according to any of aspects B1 to B11, wherein the auxiliary sensor is mounted for movement with the elevator car within an elevator shaft.

B13. An elevator car according to aspect B12, wherein the auxiliary sensor is mounted to an elevator header of the elevator car.

B14. An elevator car according to aspect B12 or B13, wherein the auxiliary sensor is mounted within the confines of the elevator car.

B15. An elevator car according to any of aspects B12 to B14, wherein the position sensor is mounted for movement with the elevator car within the elevator shaft.

B16. An elevator system including an elevator car according to any of aspects B12-B15.

The invention claimed is:
1. An elevator door sensor arrangement including:
a position sensor configured to determine a configuration of an elevator door of an elevator car;
an auxiliary sensor mounted to an elevator header of the elevator car or within the confines of the elevator car and configured to monitor for an object in a sensing region outside of the elevator car, the region being an approach to the elevator car; and
a door sensor controller configured to output a signal to a door controller indicating that an object has been sensed by the auxiliary sensor in the sensing region approaching the elevator door, wherein a depth of the sensing region extending into the approach to the elevator car is altered based on the configuration of the elevator door as determined by the position sensor.

2. An elevator door sensor arrangement according to claim 1, wherein the depth of the sensing region is reduced when the configuration of the elevator door is such that a width of an elevator door aperture has been reduced below a threshold width.

3. An elevator door sensor arrangement according to claim 1, wherein the sensing region location is moved as the elevator door configuration changes to center the sensing region with respect to an elevator door aperture.

4. An elevator door sensor arrangement according to claim 1, wherein the position sensor is a light curtain which is also configured to detect an object obstructing the elevator door.

5. An elevator door sensor arrangement according to claim 4, wherein the light curtain includes a plurality of transmitters and receivers arranged across an elevator door aperture.

6. An elevator door sensor arrangement according to claim 1, wherein the position sensor and the auxiliary sensor are configured for movement with the elevator car within an elevator shaft.

7. An elevator door sensor arrangement according to claim 1, wherein the auxiliary sensor is a radar sensor.

8. An elevator door sensor arrangement according to claim 7, wherein the auxiliary sensor is a microwave radar sensor.

9. An elevator door sensor arrangement according to claim 1, wherein the altering of the sensing region is achieved by the selection of one or more predetermined sensing zones.

10. An elevator door sensor arrangement according to claim 9, wherein the sensing zones include at least two sensing zones which overlap at least partially.

11. An elevator door sensor arrangement according to claim 9, wherein there are two sensing zones and the selection of the sensing zone as the sensing region is determined by a width of an elevator door aperture.

12. An elevator car including:
   an elevator door sensor arrangement including:
      a position sensor configured to determine a configuration of an elevator door of an elevator car;
      an auxiliary sensor mounted to an elevator header of the elevator car or within the confines of the elevator car and configured to monitor for an object in a sensing region outside of the elevator car, the region being an approach to the elevator car; and
      a door sensor controller configured to output a signal to a door controller indicating that an object has been sensed by the auxiliary sensor in the sensing region approaching the elevator door,
      wherein a depth of the sensing region extending into the approach to the elevator car is altered based on the configuration of the elevator door as determined by the position sensor, and wherein the auxiliary sensor is mounted for movement with the elevator car within an elevator shaft.

13. An elevator car according to claim 12, wherein the position sensor is mounted for movement with the elevator car within the elevator shaft.

14. An elevator system including an elevator car, wherein the elevator car includes:
   an elevator door sensor arrangement including:
      a position sensor configured to determine a configuration of an elevator door of an elevator car;
      an auxiliary sensor mounted to an elevator header of the elevator car or within the confines of the elevator car and configured to monitor for an object in a sensing region outside of the elevator car, the region being an approach to the elevator car; and
      a door sensor controller configured to output a signal to a door controller indicating that an object has been sensed by the auxiliary sensor in the sensing region approaching the elevator door,
      wherein a depth of the sensing region extending into the approach to the elevator car is altered based on the configuration of the elevator door as determined by the position sensor, and wherein the auxiliary sensor is mounted for movement with the elevator car within an elevator shaft.

* * * * *